United States Patent [19]

Gleasman et al.

[11] Patent Number: 4,491,035
[45] Date of Patent: Jan. 1, 1985

[54] DIFFERENTIAL GEAR APPARATUS

[75] Inventors: Vernon E. Gleasman, Cleveland Heights, Ohio; Keith E. Gleasman, Fairport, N.Y.

[73] Assignee: The Gleason Works, Rochester, N.Y.

[21] Appl. No.: 475,528

[22] Filed: Mar. 15, 1983

[51] Int. Cl.³ ............................................. F16H 1/38
[52] U.S. Cl. ........................................ 74/715; 74/710
[58] Field of Search .................. 74/710, 710.5, 711, 74/713, 714, 715; 29/434

[56] References Cited

U.S. PATENT DOCUMENTS

| | | | |
|---|---|---|---|
| 1,874,646 | 8/1932 | Skinner | 74/713 X |
| 2,720,796 | 10/1955 | Schou | 74/711 |
| 2,855,805 | 10/1958 | Fallon | 74/711 |
| 2,859,641 | 11/1958 | Gleasman | 74/715 |
| 2,972,265 | 2/1961 | Walter | 74/714 X |
| 3,008,350 | 11/1961 | Misener | 74/710.5 |
| 3,375,736 | 4/1968 | Saari | 74/711 |
| 3,400,611 | 5/1966 | Engle | 74/710.5 |
| 3,494,226 | 10/1970 | Biddle | 74/711 |
| 3,527,120 | 9/1970 | Duer et al. | 74/711 |
| 3,706,239 | 12/1972 | Myers | 74/715 |
| 3,735,647 | 5/1973 | Gleasman | 74/715 |
| 3,849,862 | 11/1974 | Benjamin | 74/715 X |
| 3,874,250 | 4/1975 | Duer et al. | 74/711 |
| 3,875,824 | 4/1975 | Benjamin | 74/715 |
| 3,884,096 | 5/1975 | Gleasman | 74/715 |
| 3,893,351 | 7/1975 | Baremor | 74/710.5 |
| 3,902,237 | 9/1975 | Benjamin | 74/715 |
| 4,162,637 | 7/1979 | Altmann | 74/711 |
| 4,191,071 | 3/1980 | Gleasman et al. | 74/715 X |
| 4,245,525 | 1/1981 | LeBegue | 74/711 |
| 4,269,086 | 5/1981 | Altmann | 74/710.5 X |
| 4,365,524 | 12/1982 | Dissett et al. | 74/715 |

*Primary Examiner*—Allan D. Herrmann
*Assistant Examiner*—Stephen B. Andrews
*Attorney, Agent, or Firm*—Ralph E. Harper; Morton A. Polster

[57] ABSTRACT

A differential gear assembly that includes a differential case 12 and a pair of axle ends 18a, 20a extending into, and rotatably coupled to, side gears 22, 24 located within the case. The axles are retained by locking rings 42 that are received by locking grooves 40 formed at the extreme ends of the axle ends and maintained in position by recesses 29 formed in the side gears. The axles are maintained in operative positions by a spacing arrangement that includes an axial thrust element 62 captured in one side gear recess and an element 64 that includes both a side gear thrust portion 66 and an axle thrust portion 68 which is received and captured by the recess in the other side gear. The operative position of at least one side gear 24 is maintained by a removable spacer that comprises a bifurcated collar held together by fasteners 84. Removal of the spacer 80 allows the one side gear 24 to move laterally enabling the removal of the axle spacing arrangement 62, 64 and ultimately the removal of the lock rings 42 from the axle ends to enable release of the axles 18, 20 from the differential.

6 Claims, 4 Drawing Figures

DIFFERENTIAL GEAR APPARATUS

CROSS REFERENCES TO RELATED APPLICATIONS

Application of Vernon E. Gleasman, Ser. No. 475,525, entitled Differential Apparatus and Method for Making, filed concurrently herewith, the disclosure of which is hereby incorporated by reference.

Application of Vernon E. Gleasman Ser. No. 475,526, entitled Differential Gearing Assembly, filed concurrently herewith, the disclosure of which is hereby incorporated by reference.

Application of Gene A. Stritzel, Ser. No. 475,527, entitled Improved Differential Apparatus and Method of Making, filed concurrently herewith, the disclosure of which is hereby incorporated by reference.

TECHNICAL FIELD

The present invention relates generally to drive axle assemblies and in particular to a method and apparatus for interlocking axle shafts with a differential gear assembly.

BACKGROUND ART

A drive axle assembly for a rear wheel drive vehicle, for example, typically includes an axle housing, a pair of axles for driving wheels located at the outer ends of the housing, and a differential gear arrangement mounted centrally in the housing for driving the axles. The inner ends of the axles are typically splined to drive gears in the differential gear assembly, whereas the outer ends are rotatably supported by wheel bearings located at the ends of the axle housing. Until recently the wheel bearings were usually press-fitted onto the axles and bearing retainer plates mounted at the extreme outer ends of the housing clamped the bearings to the housing and hence secured the axles in position.

At least one automobile manufacturer presently uses locking elements within the differential assembly itself to maintain the axles within the axle housing instead of axle retainer plates mounted at the ends of the housing. In the rear axle assemblies currently employing internal locking elements for retaining the axles, the differential gearing mounted within the axle housing is a conventional bevel gear differential. As is conventional in this type of differential, a ring gear rotates a differential case which mounts four interengaged bevel gears that rotate about two mutually orthogonal axes. One axis is defined by the axles to which two of the bevel gears are drivingly coupled. Generally these "axle drive" gears include splined bores that engage mating splines formed on the axle ends; this one axis is normally coincident with the rotational axis of the ring gear. The remaining two bevel gears are generally termed "spider" gears. These gears rotate on a common axis usually defined by a common shaft mounted in the case and intersecting the first axis at 90°. The spiders "differentiate" torque between the axle drive gears.

Each axle drive gear includes an annular recess adjacent and coaxial with the splined bore. Because the recess is larger than the bore, a shoulder is defined therebetween. The end of each axle includes a groove for receiving a locking "C-ring". To couple the axles to the axle assembly, each axle is first inserted, inner end first, from the respective outer ends of the housing, through the associated axle gears, until the locking grooves extend beyond the associated drive gears. C-rings are then inserted into the grooves and the axles moved outwardly so that the C-rings enter the recesses formed in the axle drive gears. The recesses are sized to prevent displacement of the C-rings from the axle ends.

The shaft for the spider gears, when positioned, extends between the axle ends and intersects the axis of the axles. By critically sizing the diameter of the shaft as well as the distance between the locking groove and end face on each axle end, the shaft in effect maintains the assembled position of the axles and further provides a thrust surface for the axles.

The installation of a differential mechanism, other than a bevel gear differential, in an axle housing employing this type of arrangement for retaining the axles within the housing presents some difficulty, if the differential to be installed does not include a shaft or a pin disposed along a line that intersects the axis of the axles. An example of one such differential is illustrated in U.S. Pat. No. 2,859,641 to Gleasman. The differential mechanism disclosed in this Gleasman patent is termed a "cross-axis compound planetary gear complex" and includes worm gears rotatably coupled to each axle and balancing gear complexes rotatably supported by the differential case for transferring torque between the axle gears. The gear complexes are mounted in pairs and each complex rotates on an axis of rotation that is substantially tangential to the pitch of its associated axle drive gear. In the differential mechanism disclosed in this Gleasman patent, the axle gears include inner end faces positioned in confronting alignment with a thrust bearing intermediate the faces. It is considered unfeasible to provide a shaft between the axle drive gears to act as a thrust and locating surface for the ends of the axles. Nevertheless, it has been considered desirable to find a method for mounting this type of differential in an axle housing of the type described above.

DISCLOSURE OF THE INVENTION

The present invention provides a new and improved apparatus for mounting a differential mechanism such as that illustrated in Gleasman U.S. Pat. No. 2,859,641 in an axle housing in which the axle shafts are retained in position by elements located within the differential case. In particular, the present invention provides a method for mounting the differential disclosed in the Gleasman patent within this type of axle housing.

In the preferred and illustrated embodiment, the differential mechanism comprises a differential case defining spaced, axially aligned bores for receiving inner ends of a pair of axles. Axle drive gears, also called side or traction gears, are slidably received and rotatably coupled to respective axle ends. Preferably the side gears include splined bores that mate with splines formed on the axle ends. A removable spacing arrangement maintains the assembled positions of the side gears and axle ends.

The axle ends are substantially conventional in construction and each includes a groove for receiving a locking element such as a "C"-ring. Each side gear includes a recess, formed concentric with the splined bore and sized to receive the locking ring when mounted to the axle end. The spacing arrangement includes an axial thrust bearing positioned between the axle ends having portions captured by the recesses formed in the side gears when the side gears are in their operative positions, thus maintaining the position of the thrust bearing. In the preferred and illustrated embodiment, the spacing arrangement also includes a removable gear spacer associated with one side gear for maintaining the one side gear in an operative position.

In assembling the overall axle assembly, the axle shafts are inserted into the axle housing until the inner splined ends extend through the side gears in the differential case. According to the preferred method, the axles are coupled to the differential case by first removing the spacer associated with the one side gear. After it is removed, the one side gear is moved laterally toward the outer end of its associated axle to a position at which the axle locking grooves are accessible. When moved to this "access" position, a substantial clearance opening is provided between the side gears. Each axle is sequentially shifted inwardly until its locking groove is exposed between the side gears. The lock ring is then inserted into the groove and the axle retracted so that the groove and lock ring enter the recess defined by its associated side gear. With the axle in this position, the lock ring cannot be displaced or otherwise removed.

After the lock rings are secured to both axle ends, the thrust bearing is placed between the side gears, in axial alignment with the ends of the axle shafts. The one side gear is then moved inwardly, with respect to the differential case, to its operative position. The gear spacer is then installed next to the one gear in order to fix its position. The thrust bearing includes portions sized to fit within the recesses in the side gears and is thus maintained in its position between the axle ends once the one side gear is moved to its operative position.

The present invention provides a simple yet effective apparatus and method for coupling axle shafts to a differential mechanism of the type that does not include a shaft mounted in the differential casing that extends between the ends of the axles.

In the preferred embodiment, the gear spacer comprises a split collar positioned between the one side gear and an inside surface of the differential case. When in position, the collar is concentric with the axis of the axle. The two halves of the collar are preferably held together by suitable threaded fasteners.

According to one embodiment of the invention, the thrust bearing comprises two elements. The first element is defined by an annulus having a diameter sized to fit within a side gear recess. This element serves as an axle thrust bearing only. The second element comprises a circular body defined by two annuli having different diameters. One annulus is sized substantially equal to the diameter of the side gears. The second annulus is sized to fit within a side gear recess of one of the side gears. When positioned between the side gears, the smaller annulus receives axial thrust forces from its associated axle end whereas the larger annulus serves as a thrust bearing for the side gears themselves. Thrust surfaces defined on opposite sides of the larger annulus confrontingly engage inner end faces formed on respective side gears. The smaller annulus is captured within the recess of its associated side gear and hence prevents the displacement of the second element from its assembled position when the side gears are in their operative positions.

In the disclosed embodiment, the second thrust element can only be removed from between the side gears after the gear spacer has been removed and the associated side gear moved to the "access" position. Once the second element is removed, the first thrust element can then also be removed and the axle ends then shifted as needed to expose and remove or install the axle lock rings.

With the present invention, current rear axle housings do not have to be modified to accommodate a differential of the type disclosed in the above identified Gleasman patent. The axle retaining arrangement used in the axle housing described above can be used in connection with this type of differential without modification and hence retooling of the axles and/or axle housings is eliminated.

Additional features of the invention will become apparent and a fuller understanding obtained in reading the following detailed description made in connection with the accompanying drawing.

DETAILED DESCRIPTION OF A PREFERRED EMBODIMENT OF THE INVENTION

Figure 1:
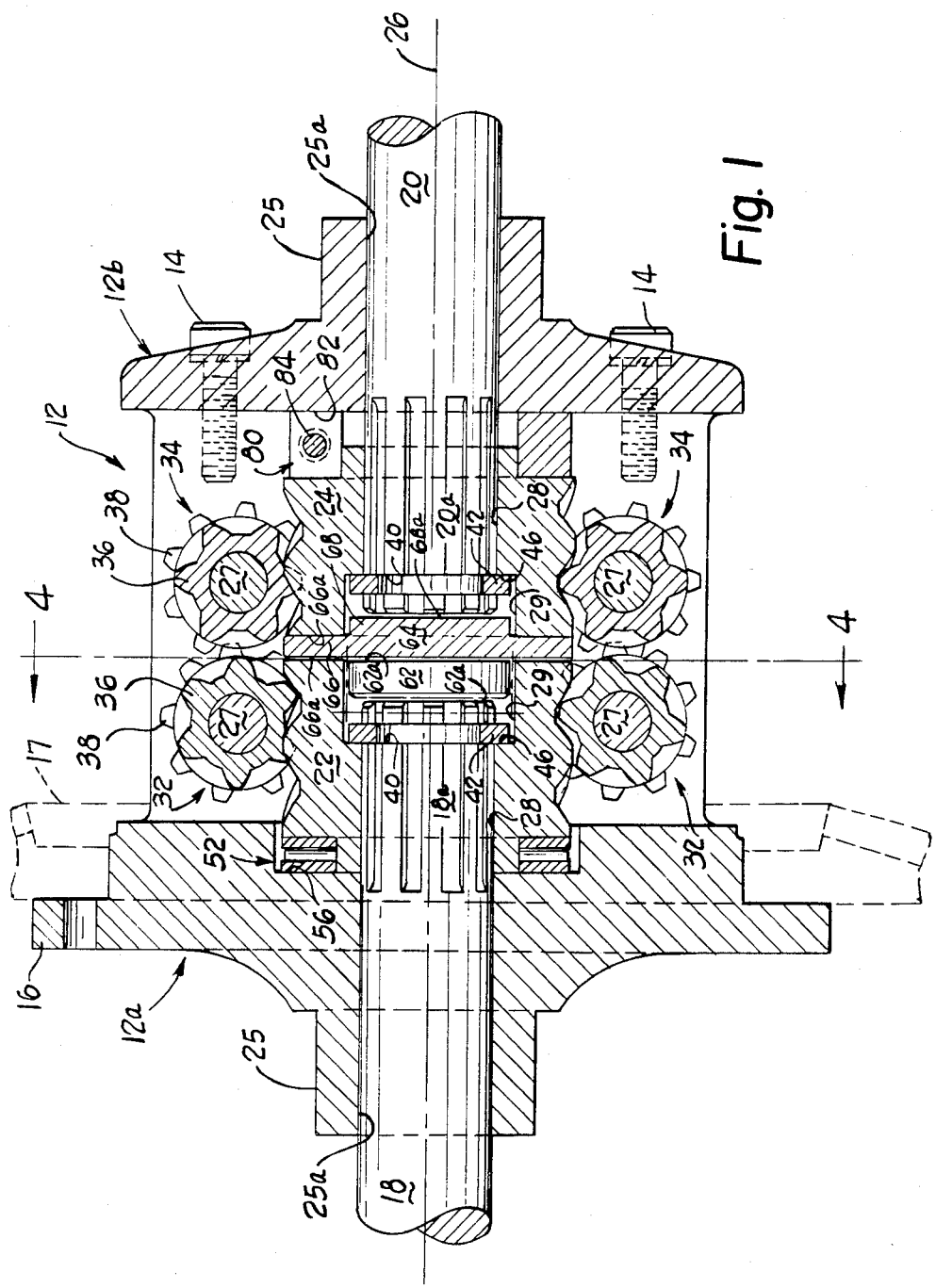
FIG. 1 is a sectional view of a differential gear assembly embodying the present invention as seen from the plane 1—1 in FIG. 3.
Figure 2:
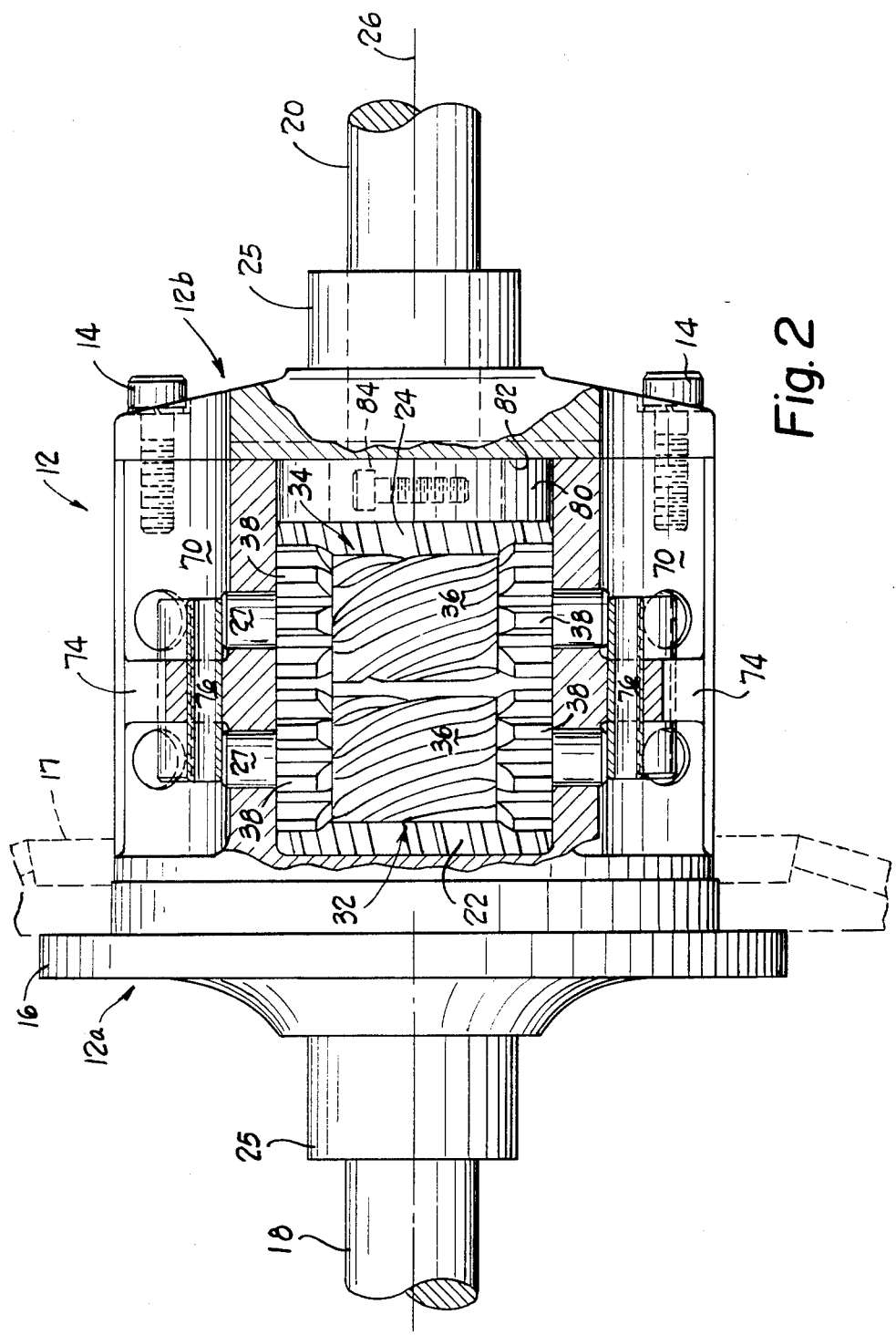
FIG. 2 is a partial sectional view of the differential gear assembly as seen from the plane indicated by the line 2—2 in FIG. 4.

The Figures illustrate the overall construction of a differential gear assembly embodying the present invention. Referring in particular to FIGS. 1 and 2, the assembly comprises a differential case 12 that in the illustrated assembly comprises a cage portion 12a which mounts a majority of the components forming the assembly and a piloted end cap 12b fastened to the side of the case 12a by a plurality of bolts 14. The cage 12a includes a radial flange 16 that mounts a conventional ring gear 17 (shown in phantom). A pair of axles 18, 20 enter the differential case from either side and extend into splined engagement with respective axle drive (also termed traction or side) gears 22, 24. Both the differential cage 12a and the end cap 12b include annular trunnions 25 by which the differential assembly is rotatably mounted to an axle housing. The trunnions 25 define bores 25a through which the axles extend.

The axles 18, 20 are generally axially aligned and rotate on an axis, indicated by the reference character 26 which is also the rotational axis for the ring gear 17 mounted to the flange 16. As is conventional, rotation of the ring gear by a pinion (not shown) or other gear arrangement effects rotation of the axles 18, 20.

The differentiating mechanism, illustrated in the figures, splits driving torque between the two axle shafts 18, 20. The differential operation is disclosed and more fully described in U.S. Pat. No. 2,859,641 and U.S. Pat. No. 4,191,071 which issued to Gleasman and Gleasman et al, respectively. Both of these patents are hereby incorporated by reference.

Figure 4:
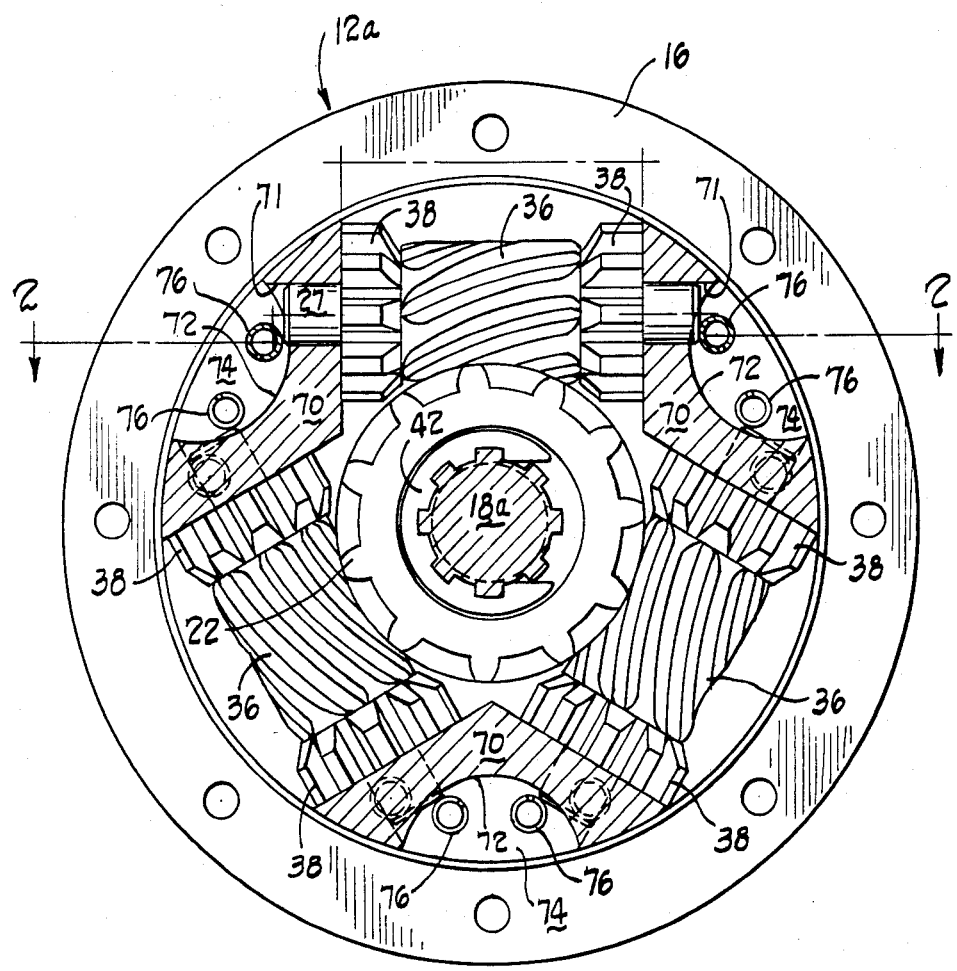
FIG. 4 is another sectional view of the differential gear assembly as seen from the plane indicated by the line 4—4 in FIG. 1.

By way of summary, the side gears 22, 24 are formed as worm gears and each includes a through bore having a splined portion 28 and a larger diameter, uniform portion defining a circular recess 29. The gears 22, 24 continuously mesh with pairs of transfer gear complexes journalled on parallel shafts 27 suitably mounted in the differential cage 12a. In the illustrated embodiment and as best seen in FIG. 4, three transfer gear complexes are associated with each side gear. Although the transfer gear complexes of a pair are substantially identical, for purposes of explanation the transfer gears associated with the side gear 22 will be designated by the reference character 32 and the transfer gears associated with side gear 24 will be designated by the reference character 34. As more fully described in the above-identified Gleasman and Gleasman et al patents, each transfer gear comprises an "irreversible gear" or worm wheel portion 36 and a pair of "reversible gears" such as spur gears 38 disposed at opposite ends of the worm wheel. The spur gears 38 of the gear complex 32 are in constant mesh with the spur gears 38 of the adjacent gear complex 34. The worm wheels 38 of the gear complex 32, 34 are in constant coengagement with their associated side gears 22, 24, respectively. Since the side gears 22, 24 are formed as worm gears and are "reversible", rotation of a side gear can effect rotation in the worm wheel of its associated transfer gear. The worm wheels 38, on the other hand, have a tooth inclination angle that inhibits the worm wheels 36 from driving the worms 22, 24. Alternatively, it should be noted that the axle drive gears and the irreversible gear portions of the transfer gears can be cross axes helical gears.

The axles 18, 20 include respective splined ends 18a, 20a. A lock ring groove 40 is formed near the extreme inner end of each axle and is shaped to receive a locking C-ring 42. The transition between the recess 29 and the splined bore portion 28 in each side gear 22, 24 defines a shoulder 46 against which the locking ring 42 seats.

When the locking rings 42 are engaged in the grooves 40 and positioned against the side gear shoulders, as seen in FIG. 1, the axles are retained within the axle housing (not shown). The combination of the locking rings 42 and the shoulders 46 prevent the outward movement of the axle shafts 18, 20.

In the illustrated construction, a torque equalizing thrust bearing 52 is placed between the side gear 22 and an internal side face 56 defined by the cage 12a. As more fully disclosed in U.S. Pat. No. 4,191,071 issued to Gleasman et al which is hereby incorporated by reference, the torque equalizer 52 aids in dividing torque load between the axles 18, 20.

In accordance with the invention, the axle ends 18a, 20a are maintained in their operative position, shown in FIG. 1, by a thrust spacer arrangement. In the illustrated embodiment, the thrust arrangement comprises two separate elements 62, 64. The element 62 comprises an annulus sized to be received within the recess 29 formed in the side gear 22 and includes relatively planar, parallel end faces 62a, one of which confrontingly engages the end face of the axle end 18a. The second element 64 is a multi-diameter element and includes a side gear thrust portion 66 and an axle thrust portion 68. The side gear thrust portion 66 is defined by an annulus or flange having a diameter substantially equal to the outer diameter of the side gears 22, 24. As seen in the figure, inner end faces of the side gears 22, 24 confrontingly engage substantially planar radial surfaces 66a formed on the portion 66 of the thrust element. The smaller diameter portion is defined by an annulus and is sized to be received within the recess 29 of the side gear 24 and it defines an end face 68a that confrontingly engages an end face of the axle end 20a. As seen in FIG. 1, the combined axial extent of the elements 62, 64 maintains a fixed spacing between the axle ends thereby maintaining the lock rings within the side gear recesses 29. Axle end thrust from the axles 18, 20 is received by the end faces 62a, 68a, respectively.

Figure 3:
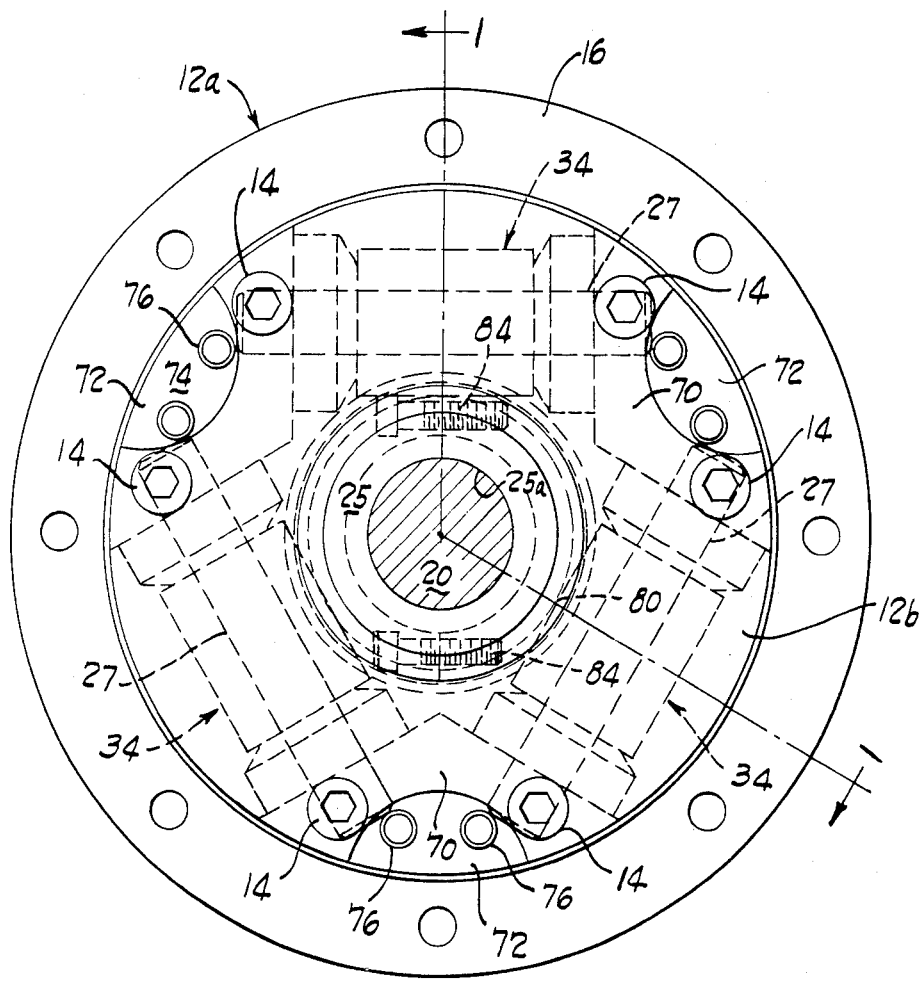
FIG. 3 is an end view of the differential gear assembly.

In order to gain access to the side gears 22, 24 and/or the thrust elements 62, 64, at least one pair of transfer gears 32, 34 must be removed. Referring to FIGS. 1, 2 and 4, the shafts 27 which rotatably support the transfer gears, extend between lateral supports or posts 70 spaced 120° apart that form part of the differential cage 12a (shown best in FIG. 4). The adjacent supports 70 define aligned bores 71 which receive the ends of the shafts 27. As seen in FIG. 4, the supports 70 are substantially V-shaped in section defining a somewhat curved, outwardly facing recess 72. As seen in FIG. 2, the recess 72 is interrupted by a bridging section 74 which serves as a mounting lug for roll pins 76 which maintain the transfer gear shafts 27 in their assembled positions. In the illustrated embodiment, the pins 76 are friction fitted into bores machined in the bridging section. As seen in FIG. 3, the roll pins are accessible for removal or insertion from the end cap side of the differential.

It should be noted that the illustrated method for retaining the shafts 27 in the position shown is one of several contemplated methods for securing the transfer gears 32, 34 in their operative positions. Other types of pins as well as set screw arrangements and other structural configurations can be used to fix the position of the transfer gears and/or shafts.

In the illustrated embodiment, a pair of transfer gears 32, 34 are removed by removing one of the roll pins 76 to enable removal of an associated pair of shafts 27, thereby releasing the transfer gears 32, 34 from the transfer gear opening in the differential cage 12a. Once the transfer gears are removed, the axles 18, 20 may be installed and/or released from the differential assembly.

According to the invention, access to the locking C-rings 42 and hence the release of the axles 18, 20 from the differential is controlled by a removable gear spacer 80, preferably positioned between the side gear 24 and an inner side face 82 of the differential end cap 12b. Referring also to FIGS. 1, 2 and 3, the removable spacer 80 preferably comprises a bifurcated collar held together by suitable threaded fasteners 84 such as cap screws.

In the preferred method, the axle shafts 18, 20 are disengaged from the differential gear assembly by first removing the fasteners 84 to release the assembled halves of the collar 80 enabling its removal through the transfer gear opening. With the collar removed, the side gear 24 can be moved towards the right (as viewed in FIG. 1) a sufficient distance along the splined end of the axle 20 to enable the removal of the thrust element 64 which as explained earlier is maintained in its assembled position by the engagement of the axle thrust portion 68 within the side gear recess 29. After the thrust element 64 is removed, the second thrust element 62 can also be removed. With the thrust elements 62, 64 removed, the axle shaft 20 can be moved to the left to expose and remove the lock ring 42 from the locking groove 40. Once the lock ring 42 is removed, the axle 20 can be pulled from the axle housing. Similarly, the axle shaft 18 can be moved to the right to expose and remove the lock ring 42 from the locking ring 40 and the axle 18 can likewise be removed from the axle housing. It should be noted that once the thrust elements 62, 64 are removed, either axle 18, 20 can be removed first.

Assembly of the axle shafts 18, 20 to the differential gearing is accomplished by reversal of the steps described above. In summary, the axle shafts 18, 20 are sequentially inserted into the differential assembly until the locking grooves 40 are accessible between the side gears 22, 24. The locking rings 42 are inserted into the grooves and the axle shafts pulled outwardly so that the locking ring seats against the shoulder 46 of its respective side gear. The thrust elements 62, 64 are then inserted and the side gear 24 moved to the left (as viewed in FIG. 1) so that the thrust elements 62, 64 are received and captured by the side gear recesses 29 and confrontingly engaged by the respective axle and side gear end faces. The split collar 80 is then reinstalled between the side gear 24 and the differential end cap 12b in order to maintain the side gear 24 in its operative position shown in FIG. 3.

With the disclosed method and apparatus, a differential assembly like that disclosed in the above identified Gleasman and Gleasman et al patents can be used in an axle housing in which the axle shafts are retained within the housing by a locking arrangement located within the differential itself. The invention provides a simple yet effective method by which to retain axle shafts within the assembly without unduly complicating the serviceability or assembly of the mechanism.

The invention was disclosed in connection with a differential having three pairs of transfer gears 32, 34. It should be appreciated that the invention is adaptable to a differential having other than three pairs of transfer gears, i.e., two pairs of transfer gears spaced 180° apart. In addition, the invention can be adapted to a standard bevel gear differential should the elimination of the common spider gear shaft be desirable.

In the disclosed embodiment of the invention, only one gear spacer 80 was illustrated. If additional "access" between the side gears 22, 24 is desired, a removable spacer can also be positioned between the side gear 22 and the inside of the differential cage 12a. This additional spacer could be located in the position now taken by the torque equalizing thrust bearing 52. To accommodate both the thrust bearing 52 and the additional spacer, the inside of the cage 12a would require additional machining to increase the depth of the recess now occupied by the thrust bearing 52, shown in FIG. 1. It is also believed, that in an embodiment that utilizes removable spacers associated with each side gear 22, 24, the clearance provided when both side gears are moved outwardly, would allow the use of a unitary thrust spacer arrangement and eliminate the need for separate thrust elements 62, 64. It must be remembered, that whether the thrust arrangement is a single or two piece element is in part determined by whether the clearance (as controlled by the axial width of the removable spacer 80) is greater than the axial extent of the thrust spacer arrangement.

In describing the present invention, reference has been made to a "rear axle housing" and "rear drive vehicles". This invention is not limited, however, to rear drive vehicles but can be adapted to either a rear or front drive arrangement as well as other applications that require differential gearing such as transfer cases and interaxles in which the axles are retained by locking elements located within the differential assembly.

Although the invention has been described with a certain degree of particularity, it should be understood by those skilled in the art that various changes can be made to it without departing from the spirit or scope of the invention as hereinafter claimed.

We claim:

1. A differential gearing assembly, comprising:

(a) a differential case including a flange for mounting a ring gear;
(b) a pair of axles including axle ends extending into said differential case, said axle ends each defining a substantially radial end face and positioned in axial alignment with and disposed along an axis of rotation of said ring gear;
(c) each axle end including a groove and a lock ring positioned in aid groove for maintaining said axle ends within said differential case;
(d) side gears slidably mounted and rotatably coupled to respective axle ends;
(e) gear means mounted to said differential case for coupling rotation of said ring gear to said side gears;
(f) removable gear spacing means located between at least one of said side gears and said differential case, for maintaining said one side gear in its operative position;
(g) each side ear including an inner end face, disposed in a plane parallel to a plane defined by an end face of its associated axle end, said gear end faces spaced axially inwardly of the end faces of their associated axle ends when said side gears are in their operative positions;
(h) axial thrust bearing means disposed intermediate said axle end faces for maintaining said axle ends in their operative positions, said axial thrust bearing means including a radially extending flange defining axial thrust surfaces for said side gear end faces, said axial thrust bearing means captured in position by recesses defined by said side gears, said axial thrust bearing means being removable when said one side gear is moved to an access position upon removing said removable gear spacing means; and
(i) said axles being sequentially movable to an access position at which the associated lock rings of said axle ends are removable, after said removable gear spacing means and said axial thrust bearing means are removed.

2. The assembly of claim 1 wherein said gear means comprises pairs of co-engaging transfer gears that include irreversible gear portions operatively engaging said side gears.

3. The assembly of claim 1 wherein said transfer gears and side gears are arranged to form a cross-axis compound planetary gear complex.

4. A method for assembling a differential of the type that includes a pair of axially adjacent side gears rotatably coupled to associated axles, each side gear defining a recess for receiving a locking element engaged with locking structure formed near ends of the axle, the method comprising the steps of:

(a) moving one of said side gears axially outwardly with respect to the inside of said differential to provide an access opening between said side gears;
(b) inserting an axle end into said differential, through said one side gear until said locking structure formed on said axle end is exposed in said access opening;
(c) engaging a locking element with said locking structure on said one axle end and with drawing said axle end to a position where said locking element is received by the recess is said one side gear;
(d) inserting another axle end into said differential, through said other side gear until its locking structure is exposed in said access opening;

(e) engaging another lock element with the locking structure on said other axle end and withdrawing said axle end until its associated locking element is received by the recess in said other side gear;

(f) positioning an axial thrust bearing arrangement in alignment with said axle ends and maintaining its position while moving said one side gear axially inwardly to an operative position; and, (g) installing a removable gear spacing means associated with said one side gear to maintain said one side gear in said operative position.

5. A spacer and thrust arrangement for maintaining a spaced-apart relationship between a pair of axle ends secured to a differential assembly by locking elements that engage locking structure formed near the ends of the axle ends, said arrangement comprising:

(a) a pair of side gears, rotatably coupled to said axle ends and located within a differential case, said side gears defining recesses for receiving and maintaining the position of the locking elements at the ends of said axle when said axles are in a predetermined spaced-apart position;

(b) axial thrust bearing means including axle thrust portions received by said recesses in said side gears to maintain the installed position of said axial thrust bearing means; and (c) removable gear spacing means associated with at least one of said side gears, said removable gear spacing means being operative to maintain said associated side gear in an operative position, and said removable gear spacing means comprising a bifurcated collar located intermediate the assodiated side gear and an inside surface of said differential case and maintained in an assembled configuration by at least one threaded fastener.

6. The arrangement of claim 5 wherein said axial thrust bearing means comprises two separate elements, one of said elements defined by an annulus sized to be received by a recesss in one side gear, the other of said elements comprising an annulus portion and a flanged portion, said other element configured such that said annulus portion is sized to be received by the recess in said other side gear and said flanged portion is sized to provide thrust surfaces for said side gears.

* * * * *

UNITED STATES PATENT OFFICE
CERTIFICATE OF CORRECTION

PATENT NO. : 4,491,035
DATED : January 1, 1985
INVENTOR(S) : Vernon E. Gleasman and Keith E. Gleasman It is certified that error appears in the above–identified patent and that said Letters Patent are hereby corrected as shown below:

In the Claims:

Column 8, line 9, delete "aid" and substitute --said--;

Column 8, line 20, delete "ear" and substitute --gear--;

Column 8, line 65, delete "is", second occurrence, and substitute -- in --.

Signed and Sealed this

Seventh Day of May 1985

[SEAL]

Attest:

DONALD J. QUIGG

Attesting Officer        Acting Commissioner of Patents and Trademarks